United States Patent
Hougham et al.

[19]

[11] Patent Number: 6,109,039
[45] Date of Patent: Aug. 29, 2000

[54] HEAT TRANSFER IN ELECTRONIC APPARATUS

[75] Inventors: Gareth Geoffrey Hougham, Ossining; Lawrence Shungwei Mok, Brewster, both of N.Y.

[73] Assignee: International Business Machines Corporation, Armonk, N.Y.

[21] Appl. No.: 09/275,649

[22] Filed: Mar. 24, 1999

[51] Int. Cl.[7] .................................................. F25B 21/02
[52] U.S. Cl. ............................................. 62/3.7; 62/259.2
[58] Field of Search ..................................... 62/259.2, 3.7

[56] References Cited

U.S. PATENT DOCUMENTS

| | | | |
|---|---|---|---|
| 5,188,286 | 2/1993 | Pence, IV. | 236/1 F |
| 5,339,214 | 8/1994 | Nelson | 361/695 |
| 5,513,070 | 4/1996 | Xie et al. | 361/700 |
| 5,549,155 | 8/1996 | Meyer, IV et al. | 165/104.33 |
| 5,568,360 | 10/1996 | Pennman et al. | 361/687 |
| 5,598,320 | 1/1997 | Toedtman et al. | 361/687 |
| 5,621,613 | 4/1997 | Haley et al. | 62/259.2 |
| 5,634,351 | 6/1997 | Larson et al. | 62/259.2 |
| 5,704,212 | 1/1998 | Erler et al. | 62/3.7 |
| 5,731,954 | 3/1998 | Cheon | 361/699 |
| 5,794,454 | 8/1998 | Harris et al. | 62/259.2 |
| 5,987,890 | 11/1999 | Chiu et al. | 62/259.2 |
| 5,992,155 | 11/1999 | Kobayashi et al. | 62/3.7 |

OTHER PUBLICATIONS

C. Wu, "A Silent Cool" Science News, vol. 152 Sep. 6, 1997 pp. 152–153.

*Primary Examiner*—William Doerrler
*Assistant Examiner*—Mark Shulman
*Attorney, Agent, or Firm*—Daniel P. Morris; Alvin J. Riddles

[57] ABSTRACT

An electronic apparatus heat extraction packaging feature wherein in the transfer of locally generated heat at a component of an electronic apparatus, the heat is stored in a buffering reservoir in the apparatus housing with a Peltier effect transfer control device being mounted external to the housing and interfaced with the thermal reservoir at the housing surface. The packaging interface permits the use of larger Peltier effect devices, greater freedom in precooling of the thermal reservoir and lighter weight portable computers where the Peltier effect devices are positioned in a docking station. In a portable computer with a battery power supply, the thermal reservoir can be independent or the battery can be employed in the thermal reservoir functions.

15 Claims, 2 Drawing Sheets

HEAT TRANSFER IN ELECTRONIC APPARATUS

CROSS REFERENCE TO APPLICATIONS

Cross reference is made to U.S. Pat. No. 5,987,890 directed to ongoing efforts in the field of this invention, assigned to the assignee of this invention and incorporated herein in it's entirety by reference.

FIELD OF THE INVENTION

The invention is directed to the transfer to and extraction from a rechargeable thermal reservoir built inside the housing of an electronic apparatus. The thermal reservoir has a capability in transferring heat from a localized heat source to a thermal reservoir for temporary holding and eventual dissipation outside the housing. The invention is particularly valuable in portable computer technology.

BACKGROUND AND RELATION TO THE PRIOR ART

As electronic apparatus configurations advance in performance and compactness, it becomes more difficult to control heat dissipation. As an example, this is particularly the situation in the portable computer technology where, as there is progress with greater performance, the heat generated by certain individual small components such as a semiconductor chip can generate so much heat in such a localized place that it is becoming increasingly difficult to extract or otherwise control. Gains achieved in portability, component density and performance in electronic apparatus are usually accompanied by increasing difficulty in removing localized heat from an individual high heat producing component by simply using the traditional physical mechanisms of conduction, convection and radiation.

Thermoelectric cooling devices using the Peltier principle have been receiving increasing attention in the art. Such devices, that are usually made of a telluride compound, respond to an electrical current by producing a localized cooler region. A number of structures and applications of the devices are described in an article by C. Wu, in Science News, Sep. 6, 1997, pages 152 and 153. Such devices however, at this stage of the art have not been employed in situations with high heat loads due to size and heat pumping efficiency. There are applications in low heat load environments such as sensing as shown as an example in U.S. Pat. No. 5,188,286.

SUMMARY OF THE INVENTION

In an electronic apparatus where, within the apparatus housing, heat produced at a localized source, is buffered in a thermal reservoir, for removal to outside the housing, under the control of a peltier effect member, an improvement is gained through the providing of a heat extraction packaging feature where a heat transfer pad for the thermal reservoir member is positioned at the surface of the apparatus housing and the cold portion of the peltier effect device is positioned in a supporting and registration facilitating member in the presence of force urging the cold portion of the peltier effect device and the heat transfer pad toward each other producing a good thermal transfer interface.

The advantages of the packaging feature of the invention is of particular use in the portable computer technology as an example where the portable computer is positioned in a docking station structure for battery charging and storage. The docking station will have the cold portion of the peltier effect device in a registration providing tray on the portion of the docking station on which the portable computer is to rest and the heat transfer pad is exposed in the bottom of the portable computer.

In the invention the combination of the thermal reservoir and the Peltier effect device are employed as a refrigerator that transfers localized heat generated at a component, at a rate that is usually high, buffers that heat by storing it in the thermal reservoir, and then transfers that heat outside the housing at selected intervals and, or, rates through selective application of electrical power to the Peltier effect device. In a battery powered portable computer the Peltier effect refrigeration operation can occur during the battery recharging cycle. Heat developed at a localized source such as a chip is immediately conducted away through a low thermal impedance conduit, or heat pipe for storage in the thermal reservoir. The thermal reservoir retains the heat in a high density heat storage material which may include the use of the latent energy in a phase transition of the storage material. The Peltier effect device in the docking station is positioned to serve as a refrigerator for the thermal reservoir or heat buffer in transferring the stored heat to an external ambient, and where desired, to precool and thus to increase the capacity of the thermal reservoir. In a portable computer with a battery power supply the battery can serve as the thermal reservoir and where more than one battery is used, one battery can serve as a thermal reservoir including employing phase transition of the electrolyte as latent energy storage while the other battery is providing operating power.

DESCRIPTION OF THE INVENTION

Figure 1:
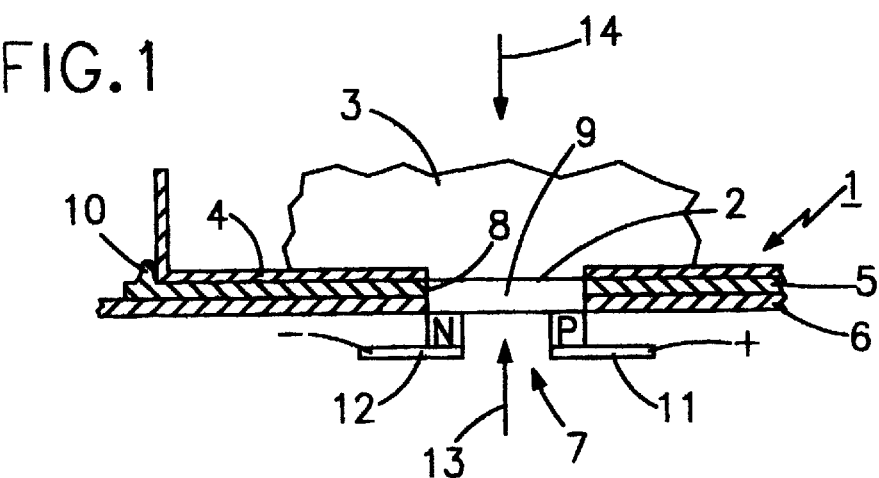
FIG. 1 is a schematic illustration of the position relationship of the elements in the heat extraction packaging feature of the invention.

In the invention there is provided a packaging interface for use of a Peltier effect device to control the transfer of heat to and from a thermal reservoir in an electronic apparatus housing in which there is at least one heat transfer pad for the thermal reservoir member that is positioned at the surface of the apparatus housing and the cold portion of the Peltier effect device is positioned in a supporting and registration facilitating member in the presence of a force urging the cold portion of the Peltier effect device and the heat transfer pad toward each other for producing a good thermal transfer interface. In FIG. 1 there is provided a schematic illustration of the positional relation of the elements in the invention. It will be apparent that there will be wide flexibility in implementing the interrelationship of the elements that are involved in the invention. Referring to FIG. 1 the packaging interface 1 of the invention includes an external face portion 2 of the thermal reservoir 3 that extends through and is essentially flush with the surface of the electronic apparatus housing 4. The electronic apparatus housing 4 in turn is positioned on a supporting and registration facilatating member 5. The supporting and registration facilatating member 5 in turn is positioned on and is supported by the overall supporting portion of the apparatus 6. A Peltier effect device 7 is positioned through an opening 8 in the portion 6 that extends through the member 5 with the cold portion 9 of the Peltier effect device 7 being essentially flush with the surface of member 5 contacting the housing 4 and contacting the portion 2 of the thermal reservoir. A registration facilitating capability such a protrusion 10 on the member 5 that positions the housing 4 is provided on the member 5. Connecting conductors 11 and 12 provide power to the Peltier device 7. Force such as is depicted by arrows 13 and 14 urge the elements 9 and 2 toward each other thereby providing a good thermal transfer across the interface between the thermal reservoir 3 and the cold portion 9 of the Peltier effect device 7. A thermally conductive elastomeric conformity enhancing material may be used in the element 9 and 2 interface. In many applications the weight of the electronic apparatus on a support as would be the case for a portable computer resting on a docking station may serve as the force urging the thermal reservoir and the cold portion of the Peltier effect device together.

Figure 2:
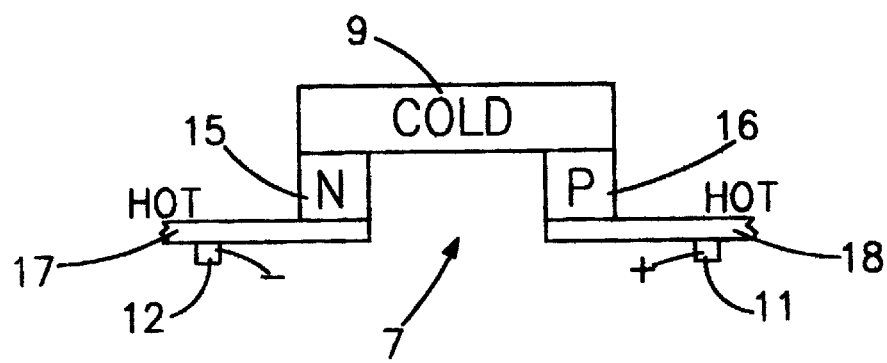
FIG. 2 is a schematic illustration of the elements and their positions in a Peltier effect device.

In the packaging interface of the invention the cold portion of the Peltier effect device is positioned through and essentially flush with a supporting and registration facilitating member. An illustration of the elements of the Peltier effect device is shown in FIG. 2. Referring to FIG. 2 there is shown a functional illustration of a semiconductor type of Peltier effect device of the type shown as element 7 of FIG. 1 in which there is a cold portion 9 at the junction between the "n" 15 and "p" 16 semiconductor elements on which there are segments 17 and 18 that get hot when power is applied between terminals 11 and 12. Peltier effect devices are available in the art as discrete components, in a range of wattage capacities. The materials used in their construction are typically telluride based; the most common being Bismuth-Telluride. A well known supplier is Marlow Industries, Dallas Tex. The device 7 is positioned through elements 5 and 6 of FIG. 1 so that the cold portion 9 is in good thermal transfer contact with the thermal reservoir 3.

In the heat extraction interface packaging feature of the invention there is within the electronic apparatus housing, a heat pipe, a thermal reservoir and a housing surface mating capability that is to mate with the cold portion of an externally mounted Peltier effect device under pressure, the assembled combination producing a capability that is able to immediately transfer away heat being generated in a localized area in the housing, to buffer that heat in a thermal reservoir and to extract that heat from the housing under the control of the Peltier effect device under independent conditions.

The thermal reservoir retains that heat in a high heat density storage material which may include the use of the latent energy in a phase transition of the storage material as a storage physical mechanism. The locallized heat that is developed, usually at a high rate at a component of the electronic apparatus is immediately transferred away from the area of the component through a low thermal impedance conduit or heat pipe to the storage in the thermal reservoir. The heat in the thermal reservoir is under the control of the Peltier effect device which has connections to external power which permits the Peltier effect device to be selective in rate and extent of removal of the stored heat and where desired, precooling of the thermal reservoir through the Peltier effect device can increase the thermal capacity of the thermal reservoir all under conditions that are independent of any other operation considerations of the electronic apparatus.

The advantages of the invention are particularly useful in a portable computer technology where power consumption and weight are significant parameters and a docking station type structure is used for storage and battery recharging. In a portable computer with a battery power supply, in addition to the recharging power in the docking station, the Peltier device capability can be placed in the docking station so that the contact pressure in the interface with the thermal reservoir pad can be supplied by the weight of the portable computer. Further, the weight and size of the Peltier effect devices will be a part of the docking station thus reducing weight in the portable computer. Still further, all thermal transfer through the Peltier effect device is independent of the time in portable computer battery recharging.

It will be apparent that within the principles of the invention that there will be flexibility in the constructions employed for the thermal reservoir. As examples, the shape can vary from a thin flat layer the area of a dimension of the housing at one extreme to a compact discrete volume element such as the battery at another extreme. Insulation around the thermal reservoir may be advantageous usually under circumstances where space permits and there is a large temperature difference in the presence of moisture. The buffering of high rate, locally produced, heat, in the thermal reservoir will normally operate in parallel with and will not affect any other conventional heat dissipation being used. This combination of thermal buffering and conventional heat dissipation will accommodate the greatest heat production while maintaining acceptable temperatures on the outside of the electronic apparatus housing. In a situation such as in an infrared invisibility military application where a very cool outside housing temperature is desired, the normal heat dissipation mechanism can be minimized by insulation.

Figure 3:
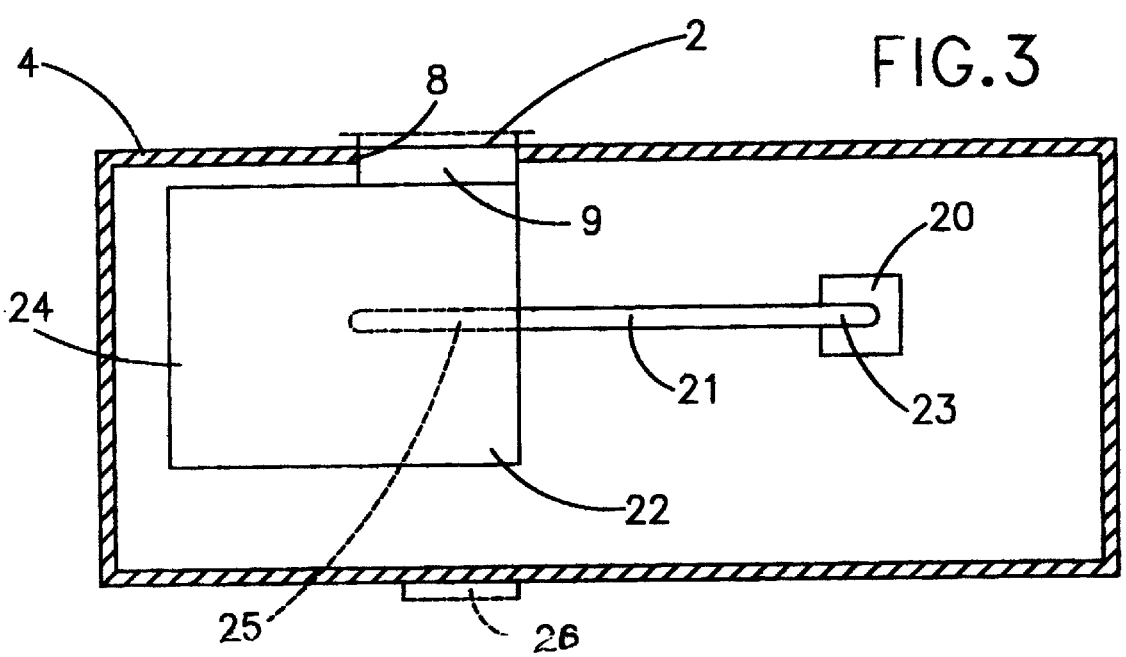
FIG. 3 is a perspective illustration of the localized heat source, the heat pipe and the heat transfer pad.

In FIG. 3. using the same reference numerals as in FIGS. 1 and 2 for like elements, there is shown a schematic illustration of the positioning relationship, in an electronic apparatus housing, such as 4 in FIG. 1, of the combination of the localized heat source 20, a heat pipe 21, the thermal reservoir 22 which corresponds to element 3 of FIG. 1 but differs therefrom by having the external mating pad 2 of FIG. 1 on the side. The element 20 is, a relatively small (in area) component of the electronic apparatus, in relation to the overall housing 4 area, such as for example a semiconductor chip. The housing 1 is generally of an insulating plastic or composite material. A metal housing can also be used. The element 21 is a low thermal impedance heat transferring device such as one of the various types of heat pipes well known and available in the art for high efficiency heat transfer. The heat pipe generally has sealed ends of a conduit tube that contains a liquid that can be vaporized at one end, which is positioned at a source of heat, with the liquid being condensed at the other end which is positioned at the location to which the heat is to be transferred. The heat pipe 21 has a good thermal transfer connection 23 to the locallized source of heat 20, such as by a fusing or soldering. There is also a good thermal transfer into the thermal reservoir 22 such as would occur by the heat pipe 21 being fused to a housing 24 of the thermal reservoir 22 or through the use of an insertion 25 of the end of the heat pipe 21, shown dotted, into the thermal reservoir heat responsive material.

The thermal reservoir 22 in accordance with this invention may be considered to be a thermal buffering device providing a number of advantages including serving as a receptacle into which heat can be transferred through the heat pipe 21 at one rate, for subsequent release under the control of the Peltier effect device shown dotted beyond the 2, 9 interface, at a different rate. Materials for the thermal reservoir 22 that have phase transitions that involve a change of physical form, such as from liquid to solid, that are accompanied by significant absorption or release of latent energy related to the phase transition, are usually the more efficient thermal reservoir materials. The invention further provides the capability through having the independently powered Peltier effect device 7 on the outside of the housing 4 with the interface of the face portion 2 and the cold portion 9 as mating pads in the opening 8 through the housing 4 to precool, on an independent time scale, the thermal reservoir 22, through as many phase transitions of the thermal reservoir material as practical thereby extending the heat absorption capacity of heat delivered by the heat pipe 21. A battery of the type used to power a portable computer can serve as a thermal reservoir and the electrolyte of a battery can serve as a phase transition material. The electrical power connections of the docking station, for battery recharging, can conveniently, with minor modifications extend charging to precooling and to supply a separate thermal reservoir. In the configuration of FIG. 3 the housing 4 when positioned by the locating protrusion 10 in FIG. 1, shown dotted in FIG. 3 as element 26, would be urging the element 2 and 9 contact pad interface toward each other and into good thermal transfer contact. A highly advantageous application of the invention occurs when the invention is used in connection with a docking station structure. The Peltier effect devices 7 are independent of any weight considerations that might flow from use in a portable device and their size and wattage are unrestricted.

Figure 4:
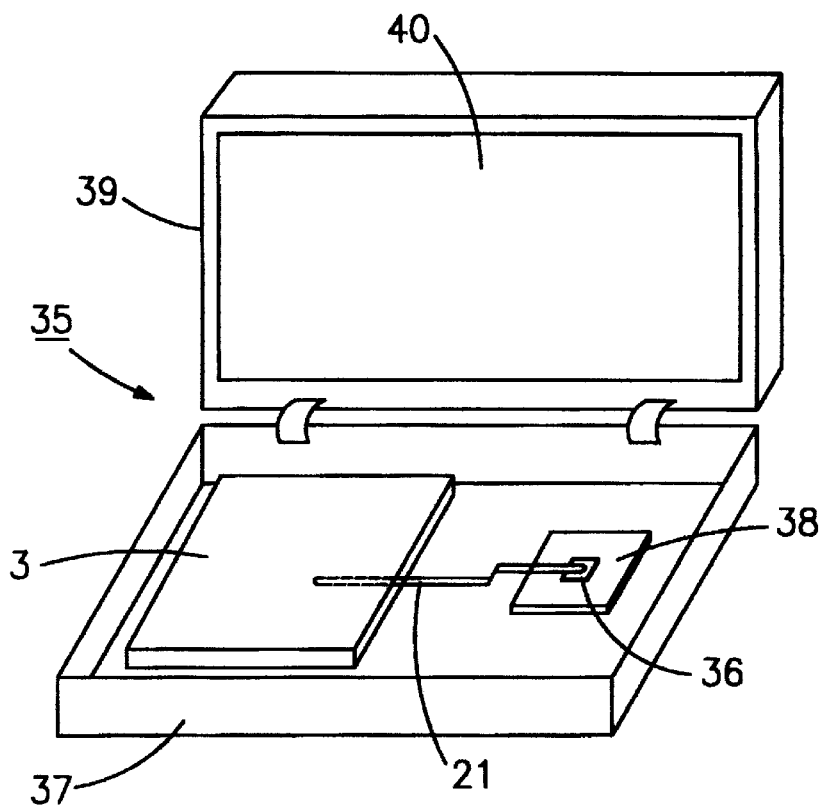
FIG. 4 is a perspective schematic of the elements of the invention in illustrative positions in a portable computer housing.
Figure 5:
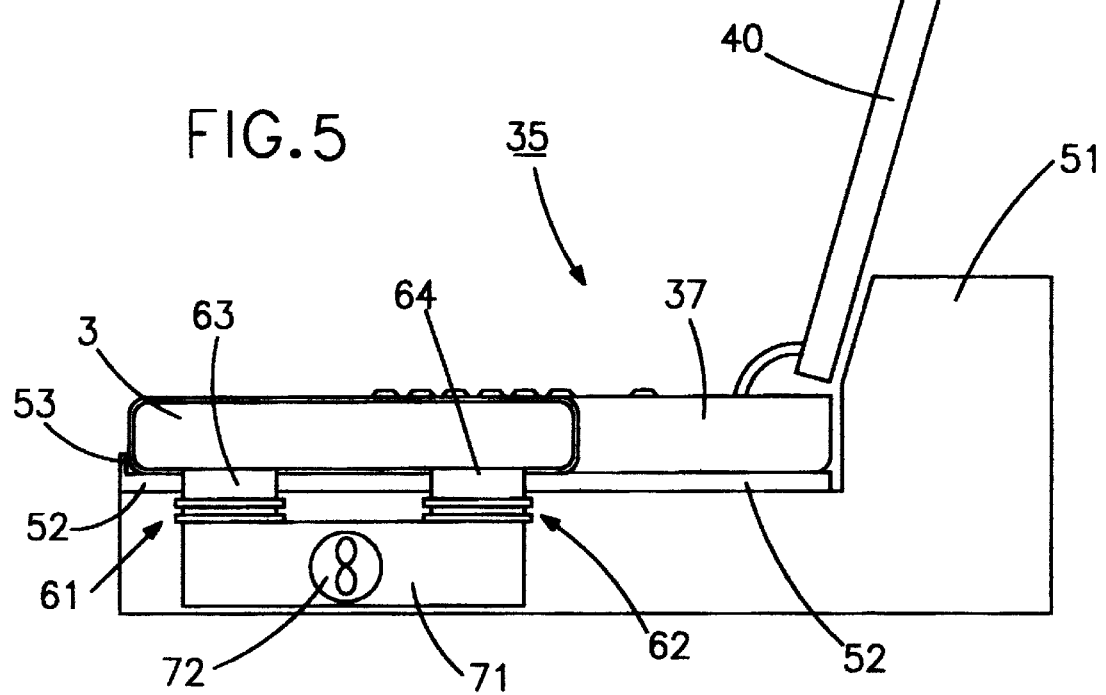
FIG. 5 is a perspective schematic illustration of the elements of the invention in position when a portable computer is docked in a docking station where the docking station has built in peltier effect devices.

Referring next to FIG. 4 where there is shown a perspective schematic of an illustrative relative positioning of the elements of the invention in an example electronic apparatus housing such as that of a portable computer. The illustrated housing 35 is of the type where a localized heat source component such as the processor chip 36 is positioned in the base 37 under the keyboard which is not shown. The chip 36 is shown mounted on a standard in the art heat sink 38. The buffered heat removal capability of the invention is independent from and generally works in parallel with any standard type of heat sink dissipation. The housing 35 also has a hinged portion 39 that contains a display 40. The hinged portion 39 serves as a cover when closed over the base 37. There is some flexibility, in size and shape of the thermal reservoir member 3 which for illustration purposes is shown as a rectangular block. The thermal reservoir member 3, in a portable computer application, needs only to have; sufficient thermal capacity to buffer all excess heat produced at the locallized source 36 at a rate greater than that at which the heat sink 38 could dissipate it. The ratio of rate of heat dissipation to the outside in relation to the heat stored in the thermal reservoir is flexible at the time of design and should be optimized for particular applications. The thermal reservoir 3 should be positioned in a portion of the base housing 37 in relation to the locallized heat source 36 adapted for heat transfer through the heat pipe 21 and having a good thermal transfer to the docking station mating member, the cold portion of a Peltier effect device 7 as shown in FIG. 1. The thermal reservoir 3 could well be integrated with the battery of a portable computer and the electrical cabling of the docking station modified to supply not only battery charging power but also Peltier device cooling power. Referring to FIG. 5 there is shown a perspective schematic illustration of the elements of the invention in position when a portable computer 35 as shown in FIG. 4 is docked in a docking station 51 where the docking station 51 has built into it the elements of the invention. When the portable computer 35 is positioned on the supporting and registration facilitating member 52 which corresponds to the element 5 of FIG. 1 and the locating ridge 53 corresponding to the element 10 of FIG. 1, elements 63 and 64 of conformable thermally conductive elastomer extend through to the pad locations in the base 37 of the computer 35 and form thermal interfaces with the cold portions 61 and 62 of Peltier effect devices mounted in the docking station 51, and supplied by power connections not shown. In operation the heat in the thermal reservoir 3 in the base 37 of the computer 35 is extracted by and under the control of the Peltier effect devices for dissipation in the heat sink 71 located in the docking station 51. The heat sink can be cooled by a relatively large fan, symbolically shown as element 72. The temperature of the thermal reservoir can be monitored and arranged so that the computer can be run without concern that components in the computer may be overheated. The time for heat extraction can be designed from a maximum of extensive precooling of the thermal reservoir 3 to normal cooling in about the duration required for a battery charge.

The principles of the invention are amenable to a wide variety of construction variations in implementation, and in types of apparatus applications. One such type of apparatus variation currently receiving attention in the art is the packing of ever higher performance into a portable computer while trying to keep the overall size comparable to a notebook, the overall weight around 5 pounds and the outside temperature so as to be comfortable resting on a user's lap.

The common Lithium ion electrolyte type portable computer battery has several useful features that are advantageous in a thermal reservoir type application. The battery is fairly compact and is adaptable to be a removable unit. It has a relatively broad temperature range of operation so that in a dual role of both power source and thermal reservoir, precooling of the battery to the bottom of that range during a charging cycle can provide locally generated heat storage up to the vicinity of the top of the range and an extension of the time until recharging is deeded. The battery also has an electrolyte that can be caused to undergo a phase transition at about −20 degrees C., within comfortable range of Peltier effect devices so as to permit latent heat to be a part of the heat storage physical mechanism. The effectiveness of latent heat as a thermal reservoir is illustrated by the fact that an electrolyte after a phase transition to solid, comparable to that of water, in a 355 milliliter quantity, which is about the quantity in a common portable computer battery, absorbs a quantity of latent heat in remelting sufficient to cool a 25 Watt computer processor chip for about 1½ hours.

The battery used to power a portable computer can thus in accordance with the invention be adapted to serve as both a source of power for the computer and as a thermal reservoir.

What has been described is a heat extraction packaging feature for a thermal reservoir and Peltier effect control capability in the transfer of locally generated heat at a component of an electronic apparatus that permits the use of larger Peltier effect devices, greater freedom in precooling of the thermal reservoir and lighter weight portable computers where the Peltier effect devices are positioned in a docking station.

What is claimed is:

1. A packaging interface between an electronic apparatus housing containing a thermal reservoir for storing heat that is produced at a locallized source within said housing and a Peltier effect control member having first and second hot junction electrical contacts and a cold junction portion, said Peltier effect control member being operable in response to power applied between said first and second contacts to become cold at said cold junction portion, comprising in combination:

a thermal contact pad portion of said thermal reservoir positioned in an opening in said housing and essentially flush with the surface of said housing surrounding said opening, said cold junction portion of said Peltier effect device being positioned in an opening in a supporting member with said cold junction being flush with the surrounding surface of said supporting member said housing and said support member being in contact with each other and in registration whereby said contact pad and said cold junction are in contact, said support member being supported by an apparatus support member having an opening accommodating said Peltier effect device, and, force means urging said contact pad and said cold junction toward each other.

2. The interface of claim 1 wherein said registration is produced by a protrusion on a support member that aligns an edge of said housing.

3. The interface of claim 2 including power cabling for said Peltier effect device that is positioned on said apparatus support member.

4. The interface of claim 3 wherein said apparatus support member is a portable computer docking station.

5. The interface of claim 4 wherein said thermal reservoir is the portable computer battery.

6. In electronic apparatus having within a housing, a thermal reservoir, a locallized source of heat, and a heat pipe delivering said heat to said thermal reservoir, the improvement for heat transfer comprising:

said thermal reservoir member positioned with a portion serving as mating pad at the outside surface of said housing, a Peltier effect member having electrical input contacts to first and second hot portions and a cold portion, said Peltier effect member being positioned through a supporting member with said cold portion being flush with the surface and serving as a mating contact with said mating pad on said housing, and, force means urging said mating pad and said cold portion toward each other.

7. The improvement of claim 6 wherein said supporting member is the base portion of a portable computer docking station.

8. The improvement of claim 7 wherein the power cabling for said electrical input contacts of said Peltier effect member is in and is supported by said base portion of said portable computer docking station.

9. A buffering capability for heat occurring at a first rate at a locallized source in a housing for dissipation outside said housing at a second rate that is different from said first rate, comprising in combination:

at least one thermal reservoir member capable of storage of heat and having an exposed portion at and flush with the surface of said housing, a low thermal impedance heat transfer member adapted for transfer of heat occurring at said localized source into said thermal reservoir member, at least one Peltier effect device having first and second electrical inputs and a cold portion, each said Peltier effect device being positioned through at least a supporting and registration facilitating member with said cold portion being flush with the surface of said supporting and registration facilitating member, and, force means operable to urge said exposed portion of said thermal reservoir and said cold portion of said Peltier effect device toward and into contact with each other.

10. The buffering capability of claim 9 wherein said cold portion of each said Peltier effect device extends through a surface and into a the base of a docking station.

11. The process of transferring heat from a thermal reservoir in an electronic apparatus housing comprising the steps of:

providing said thermal reservoir with an exposed portion to serve as a mating pad that is flush with a surface of said housing, providing a Peltier effect device having electrical input hot junctions and a cold junction said Peltier effect device being positioned in and through a supporting and registration facilitating member with said cold junction serving as a mating pad, positioning said thermal reservoir mating pad and said cold junction mating pad in contact with each other, and, applying force urging said thermal reservoir mating pad and said cold junction mating pad toward each other.

12. The process of claim 11 wherein said electronic apparatus housing is the base of a portable computer.

13. The process of claim 12 wherein said thermal reservoir mating pad is in the base of said portable computer.

14. The process of claim 13 wherein said portable computer thermal reservoir mating pad is in registration on said cold junction mating pad located in the upper surface of the base of a portable computer docking station.

15. In a portable computer docking station having a support portion on which the base of a portable computer is positioned, the improvement comprising:

at least one of, thermal energy removal means and power application means, to at least one cold junction portion each of a Peltier effect device, each said cold junction portion being positioned through and flush with said support portion of said docking station, said at least one cold junction portion serving as a mating contact with at least one one mating thermal reservoir contact positioned flush with said base of a said positioned portable computer.

* * * * *